(12) United States Patent
Parrenin

(10) Patent No.: US 9,429,177 B2
(45) Date of Patent: Aug. 30, 2016

(54) PANEL ASSEMBLY STRIP BY CLAMPING ON A SUPPORTING FRAME

(71) Applicant: Commissariat à l'énergie atomique et aux énergies alternatives, Paris (FR)

(72) Inventor: Cédric Parrenin, Til-Chatel (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 14/714,512

(22) Filed: May 18, 2015

(65) Prior Publication Data

US 2015/0330429 A1    Nov. 19, 2015

(30) Foreign Application Priority Data

May 19, 2014  (FR) ...................... 14 54458

(51) Int. Cl.
| | |
|---|---|
| *F16B 9/00* | (2006.01) |
| *F16B 9/02* | (2006.01) |
| *F16B 2/06* | (2006.01) |
| *G21F 7/04* | (2006.01) |
| *F16B 5/06* | (2006.01) |

(52) U.S. Cl.
CPC ............... *F16B 9/023* (2013.01); *F16B 2/065* (2013.01); *G21F 7/04* (2013.01); *F16B 5/0635* (2013.01); *Y10T 403/7062* (2015.01); *Y10T 403/7067* (2015.01)

(58) Field of Classification Search
None
See application file for complete search history.

(56) References Cited

U.S. PATENT DOCUMENTS

| | | | | |
|---|---|---|---|---|
| 1,897,476 A | * | 2/1933 | Himmel | E06B 1/38 52/204.591 |
| 2,296,782 A | * | 9/1942 | Fischer | E04B 1/617 108/64 |
| 3,088,627 A | * | 5/1963 | Saunders | B25J 21/02 220/377 |
| 3,410,619 A | * | 11/1968 | Delnay | B25J 21/02 312/1 |
| 3,475,808 A | * | 11/1969 | Woolsey | B25J 21/02 250/516.1 |
| 4,141,609 A | * | 2/1979 | Eisert | G21F 7/047 312/1 |
| 4,601,600 A | * | 7/1986 | Karlsson | F16B 2/065 403/338 |
| 5,113,078 A | * | 5/1992 | Takashi | G21F 1/12 250/515.1 |
| 5,131,780 A | * | 7/1992 | Love | B25B 5/101 24/522 |
| 5,228,739 A | * | 7/1993 | Love | F16B 2/065 248/229.24 |
| 5,242,200 A | * | 9/1993 | Kamm | B60R 19/24 293/126 |
| 5,662,581 A | * | 9/1997 | Jennrich | G21F 7/053 312/1 |

(Continued)

FOREIGN PATENT DOCUMENTS

| | | |
|---|---|---|
| DE | 89 13 285 U1 | 1/1990 |
| FR | 2 273 631 A1 | 1/1976 |
| WO | 84/01984 A1 | 5/1984 |

OTHER PUBLICATIONS

Search Report issued in French Patent Application No. FR 14 54458 dated Jan. 19, 2015.

*Primary Examiner* — Victor MacArthur
(74) *Attorney, Agent, or Firm* — Pearne & Gordon LLP

(57) ABSTRACT

The invention relates to a strip (31) for clamping a panel (29) onto a section (28) of a support structure to form a chamber, this strip (31) comprising a body comprising a base (42) prolonged by two sides (39, 41) that together delimit a straight groove (38) that will overlap one edge of the panel (29) and one edge of the section (32) to clamp them together, one of the edges (41) comprising several threaded holes (44), each threaded hole being provided with a clamping screw.

4 Claims, 3 Drawing Sheets

(56) References Cited

U.S. PATENT DOCUMENTS

| | | | | |
|---|---|---|---|---|
| 6,368,011 B1 * | 4/2002 | LaFountain | ........... | G09F 1/12 40/549 |
| 6,905,094 B2 * | 6/2005 | Dazet | ........... | B64C 1/1492 244/129.1 |
| 7,257,927 B2 * | 8/2007 | Sayer | ........... | B01L 1/50 312/1 |
| 8,297,007 B2 * | 10/2012 | Sayer | ........... | B01L 1/50 312/1 |
| 8,579,387 B2 * | 11/2013 | Zhang | ........... | B25J 21/02 312/1 |
| 2003/0062450 A1 * | 4/2003 | Dazet | ........... | B64C 1/1492 244/129.3 |
| 2005/0055905 A1 * | 3/2005 | Sayer | ........... | B01L 1/50 52/204.1 |
| 2008/0016799 A1 * | 1/2008 | Sayer | ........... | B01L 1/50 52/204.1 |
| 2008/0314774 A1 * | 12/2008 | Granadino | ........... | G01M 3/226 206/216 |
| 2013/0047524 A1 * | 2/2013 | Sayer | ........... | B01L 1/50 52/171.1 |
| 2014/0086680 A1 * | 3/2014 | Header | ........... | E04D 13/10 403/374.3 |

* cited by examiner

PANEL ASSEMBLY STRIP BY CLAMPING ON A SUPPORTING FRAME

TECHNICAL FIELD

The invention relates to the assembly of a closed chambeFr such as a glove box for the manipulation of radioactive material, this chamber comprising a structure with a plane panel that is applied onto a frame of this structure and is clamped on this frame by clamping means.

STATE OF PRIOR ART

As can be seen in FIG. 1, a glove box type chamber 1 for manipulation of radioactive material is formed from a rigid support structure 2 composed of sections arranged along the edges of a parallelepiped, onto which panels 3 that may be transparent are added. The panels are fixed to the support structure by C-clamps marked 4.

The panels shown in more detail in the sectional view in FIG. 2 are attached by cooperation of the C-clamps 4 with the particular so-called Omega section of the sections 6 forming the support structure.

Each section 6 has a transverse cross-section in the shape of the letter Omega: this cross-section is composed of a main concave portion 7 open facing the outside of the chamber and that is terminated by two flanges 8 and 9 at an increasing separation distance from each other.

The main concave portion 7 extends over about three-quarters of a turn around the axis of the section 6. It is globally square in shape with four consecutive sides 11, 12, 13 and 14 but one of its vertices is missing at its opening in the direction opposite the chamber. The sides 12 and 13 are at the bottom of the cross-section while the sides 11 and 14 correspond to the sides that will be on the outside of the chamber, and in contact with which the chamber closing panels marked 16 and 17 are applied.

The flange 8 extends along the side 11 extending perpendicular to this side 11 and in the direction opposite the central region of the chamber. Similarly, the flange 9 extends the side 14, and is perpendicular to this side in the direction opposite the central region of the chamber. There is thus a right angle between the two flanges 8 and 9, and they jointly delimit a tapered opening in the section facing outwards.

As can be seen in FIG. 2, the inside face 18 of the panel 16 is applied onto the side 11 of the section 6, through a seal 19 inserted between this panel 16 and the side 11.

The side 21 of this panel 16 is facing the flange 8 of the section 6, and the panel 16 is held pressed in contact with the side 11 by a C-clamp 4. The C-clamp 4 has a fixed key 23 that engages in the concave part of the section to bear on the inside face of the side 11, and a mobile key 24 that bears on the outside face 26 of the panel 16 through clamping packing 27 called the backing frame. This backing frame uniformly distributes the isolated clamping force of the different C-clamps, to limit stresses in the panel that can be fragile when it is made of polymethacrylate.

The C-clamps 4 are thus distributed around the periphery of the panel 16 to hold it in sealed contact with the support structure also called the casing, that is formed jointly by the sections assembled to each other.

In practice, the number of joint clamps is large to achieve a satisfactory seal, such that the assembly of such a glove box is necessarily long and tedious. Clamping of the first joint clamps while maintaining a backing frame tends to move the backing frame and even to make it drop. Furthermore, the operator determines the separation between the joint clamps such that it might be excessively random and vary from one operator to another. Retightening of one joint clamp tends to loosen the adjacent joint clamps and even make them move. Furthermore, the threads in the clamping screws of each joint clamp form portions that can be difficult to decontaminate if there is any contamination on the outside of the box. Finally, the series of joint clamps fitted on a globe box project such that they can get caught in clothes and/or overalls of operators.

The purpose of this invention is to disclose a solution to overcome these disadvantages.

PRESENTATION OF THE INVENTION

To achieve this, the purpose of the invention is a panel assembly strip by clamping the periphery of this panel on a section of a support structure to form a closed chamber, this strip comprising a body including a base prolonged by two sides that together delimit a straight groove that will overlap one edge of the panel and one edge of the section to clamp them together, one of the edges comprising several threaded holes, each threaded hole being provided with a clamping screw.

This strip is thus elongated in shape facilitating its gripping, and it has several uniformly spaced clamping screws, which significantly simplifies assembly of a panel.

The invention also relates to a strip thus defined, also comprising a bearing buffer of the same length as the body and running along the side that supports each clamping screw, at least one clamping screw being fixed to the pressure buffer while being free to rotate relative to this bearing buffer.

The invention also relates to a strip thus defined comprising two clamping screws fixed to the bearing buffer, each free to rotate relative to this buffer, these two screws being the two screws closest to the ends of the body.

The invention also relates to a strip thus defined, comprising a protective tab extending the side supporting the clamping screws to cover the space separating this side from the panel when the strip is in place.

The invention also relates to a strip thus defined, in which the tab is an add-on element fixed by insertion and/or gluing on the outside face of the side on which the clamping screws are fitted.

The invention also relates to a strip thus defined in which the add-on element comprising the tab is inserted into the threaded holes of the side that supports it.

DETAILED PRESENTATION OF PARTICULAR EMBODIMENTS

The basic idea of the invention is to replace the series of isolated joint clamps used in the state of the art by linear strips each comprising a linear body carrying several clamping screws and a backing frame element mounted in a captive manner.

Figure 1:
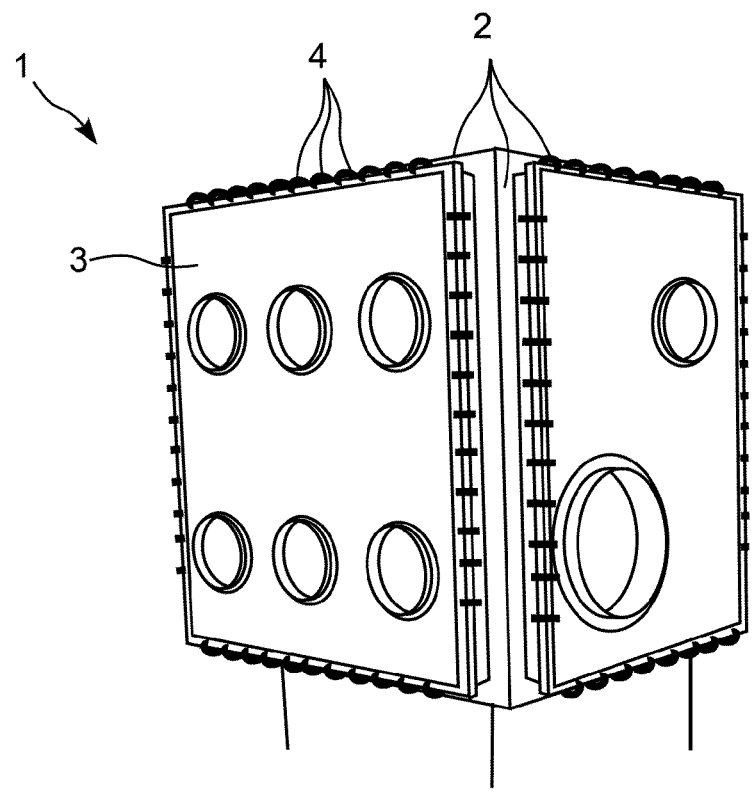
FIG. 1 is a perspective view of a glove box according to the state of the art.
Figure 2:
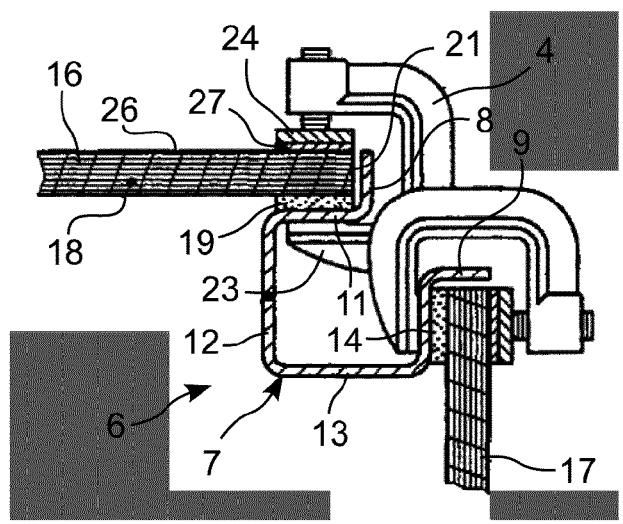
FIG. 2 is a sectional view of a section of a glove box structure to which two panels are fixed by joint clamps according to the state of the art.
Figure 3:
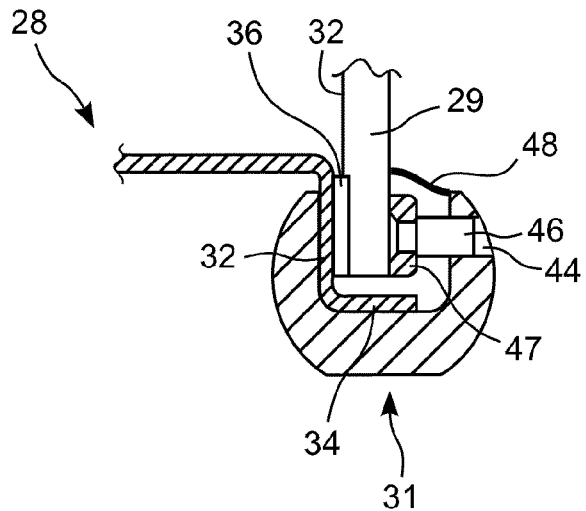
FIG. 3 is a perspective view of a clamping strip body according to the invention.

FIG. 3 shows a section 28 with a chamber structure supporting a lateral panel 29 that is mounted on this structure by means of a strip according to the invention marked 31.

The section 28 comprises one side 32 on which an inside face 33 of the panel 29 bears and that is prolonged by a flange 34 extending perpendicular to this side. The panel 29 is applied in contact with the bearing side 32 through a seal 36, being positioned such that the edge of this panel 29 is facing the flange 34 and is close to it.

Figure 4:
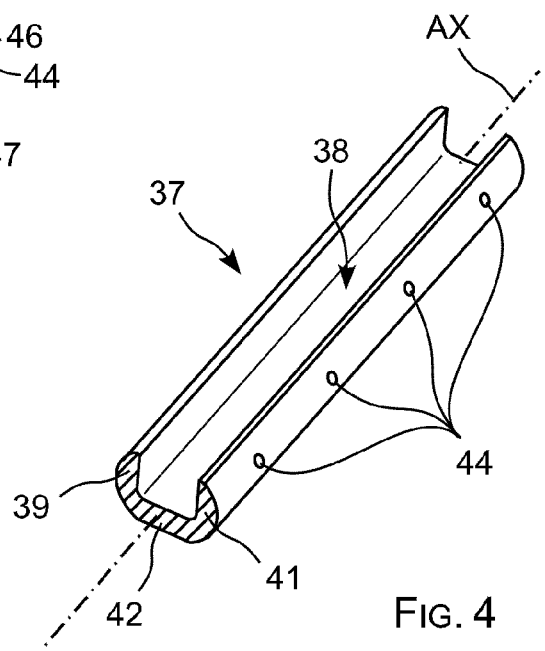
FIG. 4 is a cross-sectional view of a clamping strip according to the invention that clamps a section and a panel.

The strip 31 comprises a main body 37 visible in FIG. 4, similar to a section with a cross-section in the shape of the letter C and that will overlap the edge of a panel 29 and the corresponding side of a section so as to clamp them together.

This main body 37, which may for example be made of aluminium, thus delimits an internal groove 38 that extends along the main direction of this body denoted AX. It comprises two edges 39 and 41 each corresponding to a branch of the C-section of this body and that are connected through a central base 42.

In this case, the edge 41 of this main body comprises four through threaded holes 44 parallel to each other and perpendicular to the direction AX, and each opening up into the groove 38 at the inside face of the edge 41. Each threaded hole will hold a clamping screw like the screw 46 shown in FIGS. 3 and 5, which is a so-called setscrew, the screwing end of which comprises a cavity. This cavity may for example be a hollow hex cavity into which a key or an appropriate tool can be inserted for tightening.

As can be seen in FIG. 3, the edge 41 carrying the clamping screws is sufficiently thick so that these screws that are also designed to be relatively short, do not project beyond the outside face of the edge 41 when they are installed.

Figure 5:
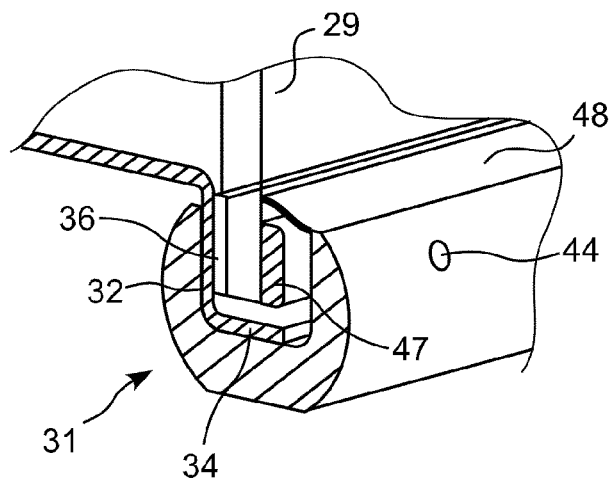
FIG. 5 is a cross-sectional view of a clamping strip according to the invention that clamps a section and a panel.

The clamping end of each screw 46 projects into the groove 38 of the inside face of the edge 41 so that it is facing the opposite edge, namely the edge 39. As can be seen in FIGS. 3 and 5, the strip according to the invention also comprises a backing frame element marked 47 that is fixed to the rest of the strip so that it is captive and thus simplifies box assembly operations.

More particularly, two of the four screws 46 have clamping ends in the form of an end piece or stud, and each of these ends is engaged and clamped in a corresponding hole of the element of the backing frame. These two screws 46 that in this case are screws located at the end of the body 37 are thus fixed to the backing frame element so that it becomes captive, while these screws are free to rotate relative to this element. The other two screws 46, namely in this case the two central screws, can be installed normally.

As can be seen in the figures, the backing frame element 47 forms a bearing buffer formed by a strip or plate with a rectangular contour, the length of which is equal to the length of the strip body, and the width of which is equal to the depth of the groove 38.

With this assembly, the backing frame element 47 is captive relative to the remainder of the strip and it performs the function of uniformly distributing clamping forces of the different screws 46 when the assembly is in position.

Note that the number of screws included in a strip may be adapted at the time of the design to the application for which the strip is designed, depending particularly on the intensity of the required average clamping force.

At the same time, a protective skirt in the form of a flexible tab forming an apron marked 48 prolongs the edge 41 of the strip body 37 extending approximately parallel to the bottom of the groove 38. This apron may be made of metal or plastic.

When the assembly is in position, as can be seen in FIGS. 3 and 5, the free edge of the flexible tab 48 is bearing on the outside face of the panel, such that it covers the region of the strip located between the element of the backing frame the edge 41 of the strip body, comprising the threads of the screws 46, in an approximately sealed manner.

This tab may be fixed to the body of the strip by being added onto the outside face of its edge or side 41, and possibly being fixed to the holes in which the clamping screws are located.

Each strip may be pre-fitted with a protective tab with the same length as the strip body. But it would also be possible to add a single interstice-free tab onto a set of installed strips to improve protection against contamination.

Each tab may be in the form of a protective cover that can be reversibly push fitted and removed without any tools on and from the side of the strip body and into and from the threaded holes of its screws.

As can be seen in the figures, the strip according to the invention can be used to clamp a section side 32 fitted with a seal 36 and a panel 29 to fix them together, by compressing them between the frame element 47 squeezed by the tightened screws 46 and the edge or side 39 of the strip body.

Due to this captive backing frame element, the assembly of the strip is significantly simplified because the operator can hold the strip body in position with one hand and tighten the screws of the strip in question with the other hand. Furthermore, the lack of relief and sharp edges on these strips facilitates their manipulation and cleaning.

Figure 6:
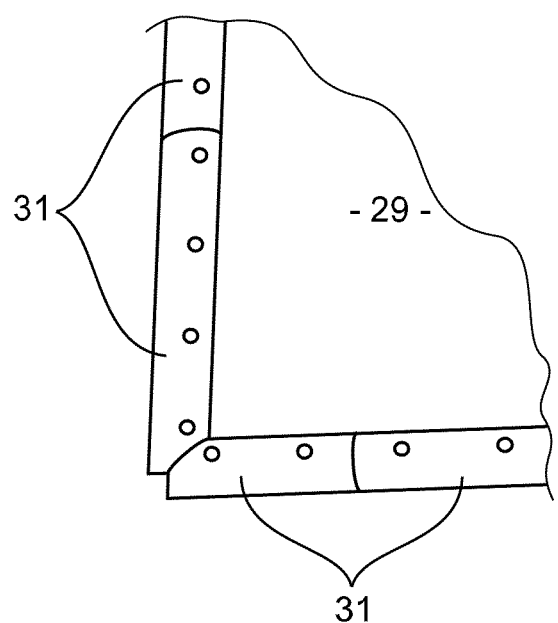
FIG. 6 is a partial view of a panel mounted on a structure using clamping strips according to the invention.

As shown in FIG. 6, the strips 31 are mounted adjacent to each other along the edge of the frame to tighten this frame around its periphery and to achieve appropriate leak tightness.

In general, the invention is applicable to closed chambers composed of a structure supporting panels clamped onto this structure, such as chambers used in incubators in hospitals. Such chambers may also correspond to spaces dedicated to the isolation of chemicals and bacteriological agents in the medical or pharmaceutical field. It can also be used for mobile chambers to be assembled quickly in civilian or military operating theatres.

The invention claimed is:

1. A strip for clamping a periphery of a panel to a section of a support structure to form a closed chamber, the strip comprising:
   a body including a base having two sides extending generally perpendicular to the base from opposite edges of the base, the base and the sides defining a straight groove dimensioned to overlap one edge of the panel and one edge of the section to clamp the panel and the section together, one of the sides having a plurality of threaded holes extending therethrough, each threaded hole having a clamping screw disposed therein, and
   a bearing buffer having a length equal to about a length of the body and at least one hole extending through the bearing buffer, the bearing buffer positioned within the straight groove of the body at a location adjacent the side of the body that the clamping screws extend through, at least one of the clamping screws having a clamping end configured for engaging and clamping the at least one of the clamping screws into the at least one hole in the bearing buffer while allowing the at least one of the clamping screws to freely rotate relative to the bearing buffer.

2. The strip according to claim 1, wherein at least two of the clamping screws are captured in at least two corresponding holes of the bearing buffer while being free to rotate relative to the bearing buffer and the at least two of the clamping screws are disposed within two of the plurality of threaded holes in the side of the body that are located near the ends of the body.

3. The strip according to claim 1, further comprising a protective tab extending along the side having the clamping screws disposed therein, the protective tab for covering a space separating the side of the strip from the panel.

4. The strip according to claim 3, wherein the tab is a separate component from the body and is attachable to the body by insertion and/or gluing the tab to an outside face of the side of the body on which the clamping screws are fitted.

* * * * *